July 26, 1938. A. R. POOL 2,125,085
SAFETY FOLDING STEP
Filed March 31, 1937
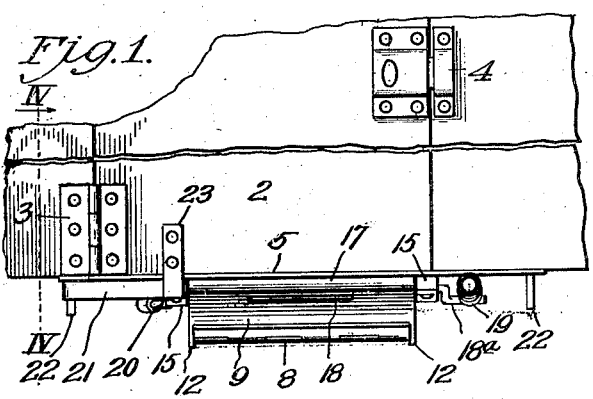
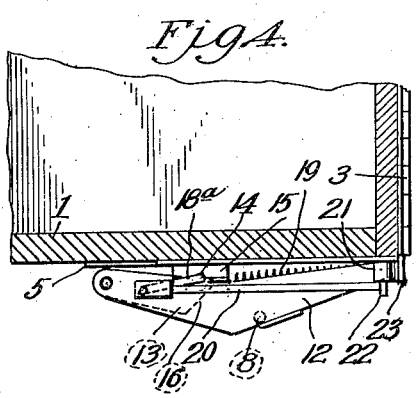
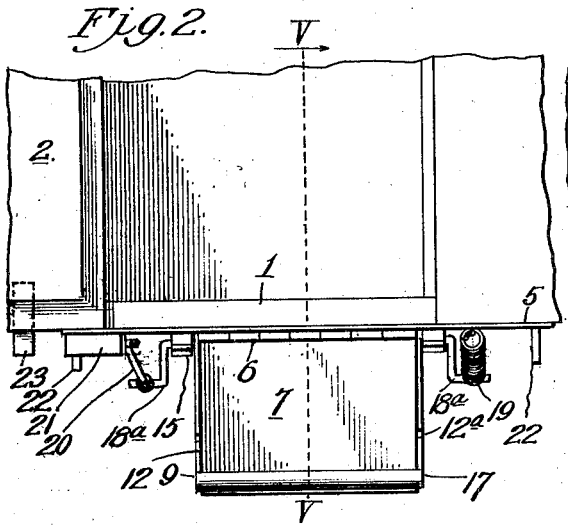
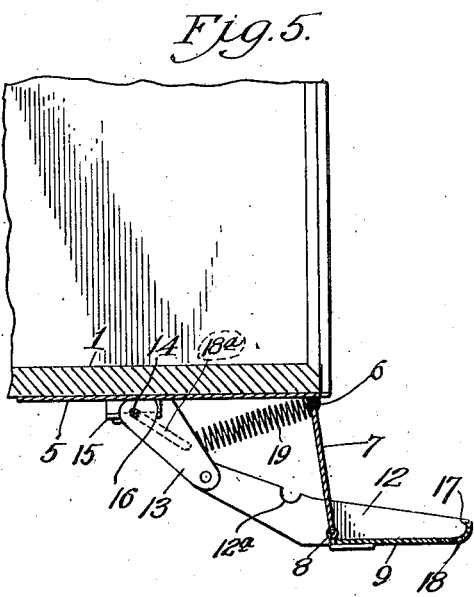
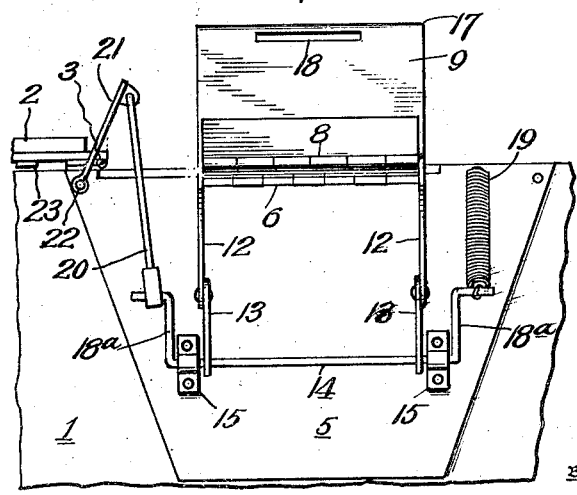
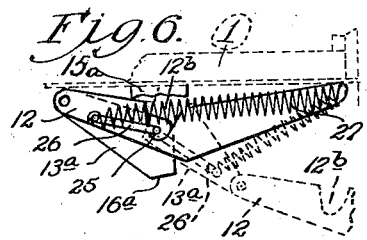
Inventor
Austin R. Pool
By Thorpe & Thorpe
Attorneys Patented July 26, 1938

2,125,085

UNITED STATES PATENT OFFICE 2,125,085

SAFETY FOLDING STEP

Austin R. Pool, Wetmore, Kans.

Application March 31, 1937, Serial No. 134,041

5 Claims. (Cl. 280—166)

This invention relates to folding steps and has for its primary object to produce a folding step for use on wheeled vehicles, such as house trailers, which will fold up into a compact relation and will not, in any of its parts, project beyond the width of the trailer or vehicle.

Another object of the invention is to produce a folding step of such nature that the operating surfaces of the tread and riser are, when folded, entirely protected against mud, water and dirt splashed up by the car wheels or by passing vehicles.

A still further object of the invention is to produce a device of the general character described which is adapted for automatic operation as controlled by the opening of the vehicle door so that when the door is open, an occupant of the vehicle is certain that the step is in position, or in which the step may be operated independently of the operation of the door.

With the general objects named in view and others as will hereinafter appear, the invention consists in certain novel and useful features of construction and organization of parts as hereinafter described and claimed; and in order that it may be fully understood, reference is to be had to the accompanying drawing, in which:

Figure 1 is a fragmentary side view of a vehicle with the step folded thereunder and the door closed.

Figure 2 is a fragmentary side view with the door open and the step unfolded.

Figure 3 is a fragmentary inverted plan view of the construction as shown in Figure 2.

Figure 4 is a cross section on the line IV—IV of Figure 1.

Figure 5 is a cross section on the line V—V of Figure 2.

Figure 6 is a fragmentary view of a modification for manual operation, independently of door movement, the figure being a side view with the near bearing broken away.

In the drawing, where like reference characters identify corresponding parts in all of the figures, 1 represents a vehicle floor, such as of a house trailer, and 2 is a door hingedly supported by the usual piano type hinge 3 or in any other desired manner. The door is adapted to be maintained closed by any suitable lock or latch 4. The automatic form of folding step, that is where its operation is controlled by movements of the door, is shown in Figures 1 to 5 inclusive, and comprises a base plate 5 adapted to be secured to the underside of the floor of the vehicle in any suitable way. Hingedly secured as at 6 to the front edge of the plate 5 is a folding step, it being understood in this connection that the plate 5 is non-essential since all of the parts later referred to may be secured directly to the floor of the vehicle, said step comprising a riser 7 which at its lower edge as at 8 hingedly carries a tread portion 9.

With this type of construction, it is apparent that to hold the step in operative position, that is with the riser substantially vertical and the tread substantially horizontal, means must be provided to prevent the step from hingedly swinging rearwardly around the riser hinge 6, and to prevent the tread from swinging downwardly around its hinge 8. To hold the step in unfolded position and to prevent it from accidentally collapsing under a load, and at the same time to form a housing for the folded step to protect its operative surfaces, the tread and riser, against mud and dirt splashed up from the roadway, the side edges of the tread as here shown have flange portions 20 12, which embrace the end edges of the riser. Said flange portions 12 slope rearwardly and upwardly, and at their rear extremities are pivotally connected to crank arms 13, keyed or otherwise secured to a rock shaft 14 held up against the bottom side of the plate 5 by bearings 15. Referring to Figures 2, 3 and 5, it will be noted that when the step is unfolded to operative position, each of the crank arms 13 have stop or abutment portions or edges 16, which, by contact with the underside of the floor 1 or of the plate 5 if the latter it used as shown, brace and hold the tread portion 9 against swinging around its hinge 8 below a substantially horizontal plane, these abutment portions also holding the step against swinging around the riser hinge 6, since the load is always on the step on the side of the hinges opposite that of the abutments. If force is applied on the tread tending to cause said tread to swing on its hinge 8 toward the face of the riser 7, such force causes the parts to swing to step-folded position as shown in Figures 1 and 4. It will be noted that when the parts are in this position, the riser 7 is swung up toward parallelism with and under the floor 1 of the vehicle, while the operative face of the tread 9 is swung into relative contact with the corresponding face of the riser 7, the side flanges 12 providing a box or housing portion by contact with the underside of plate 5 to close the joint between the riser and tread at the two ends, the hinge 8 closing one side, and an upstanding lip 17 on the front edge of the tread closing the fourth side of the housing. With the parts in the proportions shown, the flanges 12 have notches 12a in their upper edges to accommodate the rock shaft 14 when the step is folded to collapsed position. The operative parts of the step as far as those with which a person comes into contact are concerned, are thus housed against dirt deposits splashed up from the roadway. The tread may be formed with a slot 18 as a mud opening if it is desired to utilize the lip 17 as a shoe scraper when the step is down in operative position.

In actual practice, in order to insure that the step will always be in position when the door of the vehicle is open, to prevent a person in the trailer from carelessly stepping out, the following mechanism may be provided: The opposite ends of the rock shaft 14 are formed with identical crank arms 18a, the relation of the crank arms to the position of the safety step being such that a retractile spring 19 connected to one of the crank arms at one end and to the base plate 5 at the other end, tends to constantly urge the step to unfolded position. To close the step against the force of the spring 19, the other crank arm 18a is pivotally connected to a link 20, the opposite end of said link being pivotally connected to a second link 21, which in turn, at its other end, is pivoted on a pin or stub shaft 22, downwardly projecting from the base plate 5. Secured to and projecting below the bottom edge of the door 2 is an operating arm 23, which on the closing of the door is adapted to strike the link 21 and force same inwardly, this movement, through the linkage described, rotating the rock shaft 14 to cause the crank arms 13 to swing and move the step to folded position. In this connection it is to be noted that the plate 5 is provided with a pair of downwardly projecting pins 22, and the rock shaft 14 is duplicated at opposite ends, so that the device may be readily fitted to either right or left hand doors without requiring any change in the parts of the structure. When the door is completely closed it is latched by the bolt mechanism 4 to hold the door shut and the step folded, since it will be evident that the spring 19, not only tends to unfold the step but also to open the door.

In some cases, it may not be desirable to have the step automatic, in the sense that it operates in accordance with the swing of the door of the vehicle, but to have it operate independently of the door. In Figure 6, such a construction is shown, the only difference being that the linkage to the door is entirely omitted and the crank arms 13a and the abutment portions 16a are slightly modified in shape as compared with the corresponding parts 13 and 16 of the preceding figures, since it is necessary to extend the bearing 15a (corresponding to the bearings 15), a greater distance downwardly in order to provide a space above the rock shaft 14 to permit the springs (hereinafter identified) to pass above center, as will be described hereinbelow. As in the preceding figures, the opposite ends of a rock shaft 25 are formed with identical crank arms 26, connected by retractile springs 27 to the base plate. In this construction, the parts are so proportioned that when the step is collapsed by manual upward pressure on the outer edge of the tread, continued pressure against the force of the springs 27 causes the rock shaft 25 to move to such degree as to throw the crank arms 26 slightly past center, when the step is fully folded. To accommodate this action with the parts proportioned as in Figure 6, the notch 12b in the arms 12 must be deeper than the corresponding notch 12a of the other figures. When the crank arms go past center, it will be evident that the force of the spring 27 is then applied to hold the step in folded position. When it is desired to open the step, the tread portion is grasped and a pull is exerted to cause the cranks 26 to pass center in the reverse direction, the springs 27 after such point has been passed moving the step down to open or operative position.

From the above description it will be apparent that I have produced a folding safety step embodying all of the features of advantage pointed out as desirable, and while I have described and illustrated what now appears as the preferred embodiment of the invention, it is to be understood that I reserve the right to all changes within the spirit of the invention and without the ambit of the prior art.

I claim:

1. In a folding step, a horizontal support, a riser hinged to said support, a tread hinged to the lower edge of the riser, a two-part brace, to limit the unfolding movement of the step, one part being rigidly connected to the tread and the other part being pivotally connected at one end to the support and at its other end to the first brace part, and an abutment portion on said second brace member limiting unfolding movement of the step by contact with said support.

2. In a folding step, a support, a riser hinged to said support, a tread hinged to the lower edge of the riser, resilient means for urging the step to unfolded position, a pair of rearwardly and upwardly extending arms projecting from the tread, crank arms pivotally connected to the ends of said tread arms, and abutment portions on said crank arms for contacting the support to limit unfolding movement of the step.

3. In a folding step, a horizontal support, a riser hinged to said support, a tread hinged to the lower edge of the riser, said riser and tread being adapted to fold with their operating faces in proximity, extension portions on the ends of the tread snugly receiving the riser when the step is folded to form a closure for the operating faces of the riser and tread, said extension portions forming one part of a two-part step brace, second brace members having one of their ends pivotally secured to the first brace members and having their other ends pivoted to the support, and abutment portions on said second brace members limiting unfolding movement of the step by contacting said support.

4. In a folding step, a support, a riser hinged to said support, a tread hinged to the lower edge of the riser, a pair of rearwardly and upwardly extending arms projecting from the tread, crank arms pivotally connected to the ends of said tread arms and having abutment portions contacting the support to limit unfolding movement of the step, and resilient means urging the crank arms to unfold the step.

5. In a folding step, a support, a riser hinged to said support, a tread hinged to the lower edge of the riser, a pair of rearwardly and upwardly extending arms projecting from the tread, crank arms pivotally connected to the ends of said tread arms and having abutment portions contacting the support to limit unfolding movement of the step, and resilient means related to the crank arms to hold the step open or closed accordingly as the crank arms pass center in their pivotal movement in relation to said resilient means.

AUSTIN R. POOL.